(12) United States Patent
Huang et al.

(10) Patent No.: US 11,955,055 B1
(45) Date of Patent: Apr. 9, 2024

(54) DISPLAY PANEL DRIVING METHOD, DRIVE CIRCUIT, AND LED DISPLAY APPARATUS

(71) Applicant: HKC Corporation Limited, Guangdong (CN)

(72) Inventors: Peidi Huang, Guangdong (CN); Tao Gu, Guangdong (CN); Baohong Kang, Guangdong (CN)

(73) Assignee: HKC CORPORATION LIMITED, Guangdong (CN)

( * ) Notice: Subject to any disclaimer, the term of this patent is extended or adjusted under 35 U.S.C. 154(b) by 0 days.

(21) Appl. No.: 18/238,277

(22) Filed: Aug. 25, 2023

(30) Foreign Application Priority Data

Mar. 17, 2023 (CN) .......................... 202310260475.3

(51) Int. Cl.
*G09G 3/20* (2006.01)
*G09G 3/32* (2016.01)

(52) U.S. Cl.
CPC ......... *G09G 3/2096* (2013.01); *G09G 3/2007* (2013.01); *G09G 3/32* (2013.01); *G09G 2310/0213* (2013.01); *G09G 2320/0233* (2013.01); *G09G 2320/0285* (2013.01); *G09G 2330/021* (2013.01); *G09G 2360/16* (2013.01)

(58) Field of Classification Search
CPC ...... G09G 3/2096; G09G 3/2007; G09G 3/32; G09G 2310/0213; G09G 2320/0233; G09G 2320/0285; G09G 2330/021; G09G 2360/16
See application file for complete search history.

(56) References Cited

U.S. PATENT DOCUMENTS

| 2008/0303804 | A1 | 12/2008 | Schmidt et al. |
| 2010/0289884 | A1 | 11/2010 | Kang |
| 2014/0071028 | A1 | 3/2014 | Han |
| 2019/0164511 | A1* | 5/2019 | Aoyama .............. G09G 3/3666 |

(Continued)

FOREIGN PATENT DOCUMENTS

| CN | 103280182 A | 9/2013 |
| CN | 103956143 A | 7/2014 |

(Continued)

OTHER PUBLICATIONS

Chinese First Office Action dated May 6, 2023 issued in CN 202310260475.3.

*Primary Examiner* — Andrew Sasinowski
(74) *Attorney, Agent, or Firm* — Scully, Scott, Murphy & Presser, P.C.

(57) ABSTRACT

A display panel driving method includes: obtaining a target grayscale value of each pixel unit in picture data of a frame to be displayed; determining, based on the target grayscale value of the pixel unit in the picture data of the frame to be displayed, a target pixel unit row that needs luminance compensation in the frame to be displayed; and if a display panel is driven to display a picture of the frame to be displayed, when a non-target pixel unit row is scanned, outputting, through scanning lines corresponding to the non-target pixel unit row, scanning signals with turn-on voltages each equal to a first turn-on voltage; and when a target pixel unit row is scanned, outputting, through scanning lines corresponding to the target pixel unit row, scanning signals with turn-on voltages higher than the first turn-on voltage.

17 Claims, 8 Drawing Sheets

(56) References Cited

U.S. PATENT DOCUMENTS

| | | | |
|---|---|---|---|
| 2020/0394964 A1* | 12/2020 | Hyun | G09G 3/2007 |
| 2021/0225268 A1* | 7/2021 | Peng | G09G 3/32 |
| 2021/0280133 A1* | 9/2021 | Cai | G09G 3/3258 |
| 2022/0036841 A1 | 2/2022 | Guo et al. | |
| 2022/0102583 A1* | 3/2022 | Baumheinrich | H01L 27/156 |

FOREIGN PATENT DOCUMENTS

| | | |
|---|---|---|
| CN | 105096834 A | 11/2015 |
| CN | 109410834 A | 3/2019 |
| CN | 113053301 A | 6/2021 |
| CN | 113851090 A | 12/2021 |
| CN | 114596812 A | 6/2022 |
| CN | 115101008 A | 9/2022 |
| JP | 2005157009 A | 6/2005 |
| TW | 200410187 A | 6/2004 |

\* cited by examiner

DISPLAY PANEL DRIVING METHOD, DRIVE CIRCUIT, AND LED DISPLAY APPARATUS

CROSS-REFERENCE TO RELATED APPLICATION(S)

This application claims priority to Chinese Patent Application No. 202310260475.3, filed Mar. 17, 2023, the entire disclosure of which is hereby incorporated by reference.

TECHNICAL FIELD

The present disclosure relates to the field of display technologies, and in particular, to a display panel driving method, a drive circuit, and an LED display apparatus.

BACKGROUND

With the continuous development of the display industry, various improved display effects and technologies emerge in endlessly. Among them, the Mini light-emitting diode (Mini LED) technology rapidly becomes widely known due to its powerful advantages. With its higher resolution, contrast, color gamut, and other characteristics, the Mini LED technology is widely applied in both direct view and backlight markets. However, due to a parasitic capacitor in a data line in the Mini LED product and a small pitch between the LED lamp beads, there are necessarily various problems of a small-pitch product, for example, some low grayscale areas (a first row area or gradient picture areas) in a displayed picture are displayed dimly.

Therefore, there is an urgent need to solve a problem that a low grayscale area in an existing Mini LED display apparatus is displayed dimly.

SUMMARY

A first aspect of the present disclosure provides a display panel driving method, where the display panel driving method is used to drive a display panel for displaying, the display panel includes a plurality of scanning lines extending along a row direction, a plurality of data lines extending along a column direction, a plurality of pixel units arranged in an array and defined by intersections of the plurality of scanning lines and the plurality of data lines, and each scanning line is used to output a corresponding scanning signal to a corresponding pixel unit row; the display panel driving method includes: obtaining a target grayscale value of each pixel unit in picture data of a frame to be displayed; determining, based on the target grayscale value of the pixel unit in the picture data of the frame to be displayed, a target pixel unit row that needs luminance compensation in the frame to be displayed; and when the display panel is driven to display a picture of the frame to be displayed, outputting corresponding scanning signals through the plurality of scanning lines according to a preset time sequence to implement progressive scanning of a plurality of pixel unit rows, which includes: when a non-target pixel unit row is scanned, outputting, through scanning lines corresponding to the non-target pixel unit row, scanning signals with turn-on voltages each equal to a first turn-on voltage; and when a target pixel unit row is scanned, outputting, through scanning lines corresponding to the target pixel unit row, scanning signals with turn-on voltages higher than the first turn-on voltage, where the non-target pixel unit row is a pixel unit row other than the target pixel unit row.

A second aspect of the present disclosure further provides a drive circuit, where the drive circuit is configured to drive a display panel for displaying, the display panel includes a plurality of scanning lines extending along a row direction, a plurality of data lines extending along a column direction, and a plurality of pixel units arranged in an array and defined by intersections of the plurality of scanning lines and the plurality of data lines, where the drive circuit includes a row driver, an algorithm controller, and a timing controller separately electrically connected to the row driver and the algorithm controller, where the timing controller is configured to control the row driver to output corresponding scanning signals to corresponding pixel unit rows through scanning lines; the algorithm controller is configured to obtain a target grayscale value of each pixel unit in picture data of a frame to be displayed, determine, based on the target grayscale value of the pixel unit in the picture data of the frame to be displayed, a target pixel unit row that needs luminance compensation in the frame to be displayed, and feed the target pixel unit row back to the timing controller; and in a process of the display panel displaying a picture of the frame to be displayed, the timing controller is configured to control the row driver to output corresponding scanning signals through the plurality of scanning lines according to a preset time sequence to implement progressive scanning of a plurality of pixel unit rows, where when the drive circuit scans a non-target pixel unit row, the timing controller is specifically configured to control the row driver to output, through scanning lines corresponding to the non-target pixel unit row, scanning signals with turn-on voltages each equal to a first turn-on voltage; and when the drive circuit scans a target pixel unit row, the timing controller is specifically configured to control the row driver to output, through scanning lines corresponding to the target pixel unit row, scanning signals with turn-on voltages higher than the first turn-on voltage, where the non-target pixel unit row is a pixel unit row other than the target pixel unit row.

A third aspect of the present disclosure further provides an LED display apparatus, and the LED display apparatus includes the foregoing drive circuit and a display panel, where the display panel is an LED display panel, the drive circuit is electrically connected to the display panel, and the drive circuit is configured to drive the display panel for displaying.

DETAILED DESCRIPTION

The technical solutions in the embodiments of the present disclosure will be described clearly and completely below with reference to the accompanying drawings in the embodiments of the present disclosure. Apparently, the described embodiments are only some rather than all of the embodiments of the present disclosure. All other embodiments obtained by those of ordinary skill in the art based on the embodiments of the present disclosure without creative efforts shall fall within the protection scope of the present disclosure.

In the description of the present disclosure, it should be noted that, the terms "first", "second", and the like are used for descriptive purposes only and should not be construed as indicating or implying the relative importance.

Figure 1:
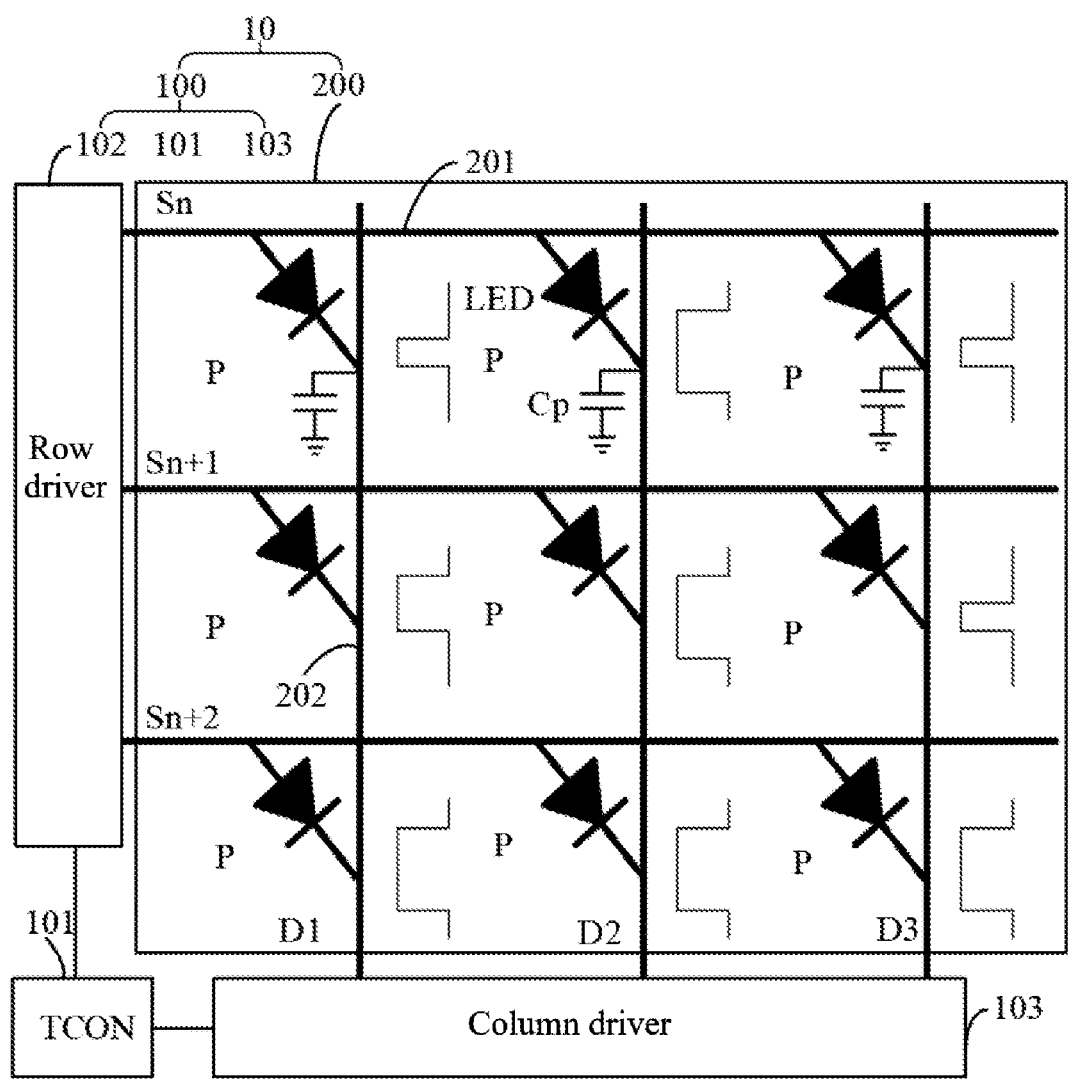
FIG. 1 is a schematic diagram of a structure of an existing LED display apparatus.

Referring to FIG. 1, an existing LED display apparatus 10 includes a drive circuit 100 and a display panel 200. The drive circuit 100 is configured to drive the display panel 200 for displaying, the display panel 200 includes a plurality of scanning lines 201 extending along a row direction, a plurality of data lines 202 extending along a column direction, and a plurality of pixel units P arranged in an array and defined by intersections of the plurality of scanning lines 201 and the plurality of data lines 202. The drive circuit 100 includes a timing controller (TCON) 101, a row driver 102, and a column driver 103.

The timing controller 101 is separately electrically connected to the row driver 102 and the column driver 103, the row driver 102 is electrically connected to pixel units P of each row through the plurality of scanning lines 201, and the column driver 103 is electrically connected to pixel units P of each column through the plurality of data lines 202.

The timing controller 101 is configured to store picture data of a frame to be displayed, for example, when the display panel 200 is displaying a picture of a current frame, the timing controller 101 stores picture data of a next frame. When the drive circuit 100 drives the display panel 200 to display the frame to be displayed, the timing controller 101 controls, according to a preset time sequence based on the picture data of the frame to be displayed, the row driver 102 to output corresponding scanning signals to a plurality of pixel unit rows through the plurality of scanning lines 201, and controls the column driver 103 to output corresponding data signals to a plurality of pixel unit columns through the plurality of data lines 202, to drive the display panel 200 to display a picture of the frame to be displayed.

Further, the display panel 200 is an LED display panel, such as a Mini LED display panel or a Micro LED display panel. Specifically, each pixel unit P includes one light-emitting diode (LED), an anode of the light-emitting diode is electrically connected to a corresponding scanning line 201 to receive a scanning signal, and a cathode of the light-emitting diode is electrically connected to a corresponding data line 202 to receive a data signal. The light-emitting diode emits light based on the received scanning signal and data signal.

Figure 2:
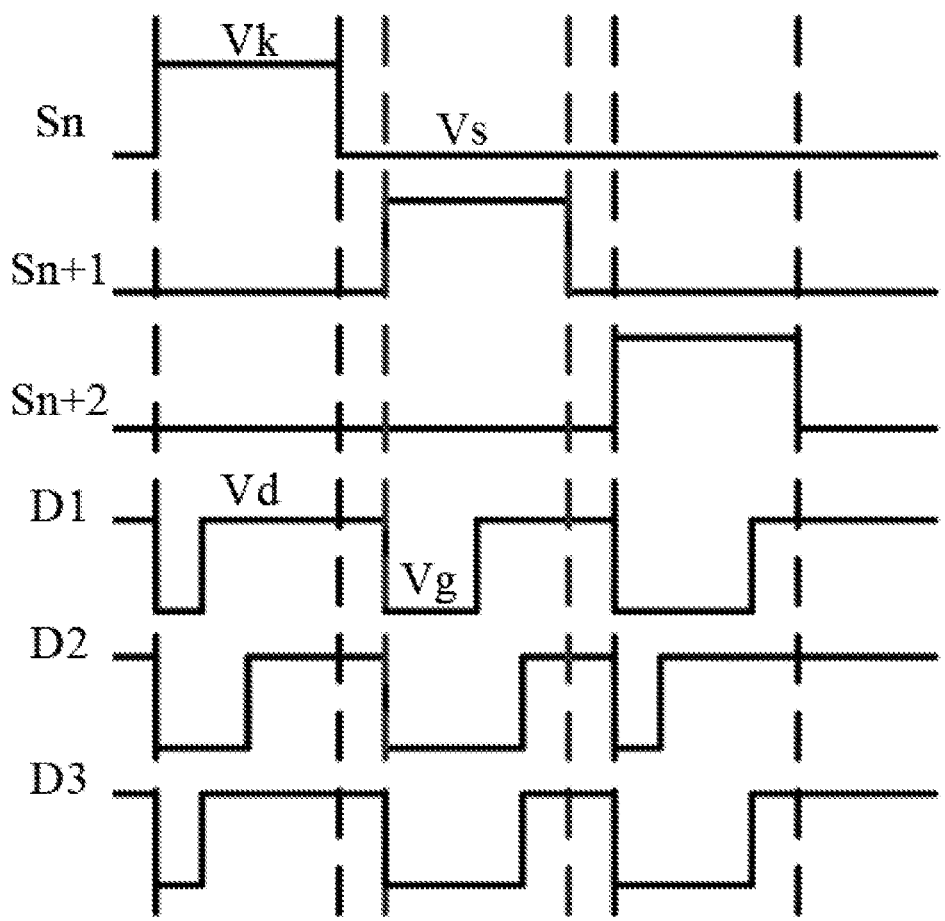
FIG. 2 is a timing diagram of scanning signals and data signals according to an embodiment of the present disclosure.

A working process of the LED display apparatus 10 will be described below with reference to FIG. 1 and FIG. 2. A driving mode of the drive circuit 100 is progressive scanning. When scanning is performed on an $n^{th}$ row, taking a pixel unit P in the $n^{th}$ row and a first column in FIG. 1 as an example, an anode of a light-emitting diode in the pixel unit P receives a turn-on voltage Vk of a scanning signal Sn in the $n^{th}$ row through an $n^{th}$ scanning line, and a cathode of the light-emitting diode in the pixel unit P receives an operating voltage Vg in a data signal D1 through a first data line, a voltage difference is formed between the anode and the cathode of the light-emitting diode in the pixel unit P, and a current flows from the anode to the cathode of the light-emitting diode, such that the light-emitting diode emits light. As shown in FIG. 2, in the prior art, turn-on voltages Vk of all scanning signals are equal (for example, equal to a first turn-on voltage Vk1), and operating voltages Vg of all data signals are also equal (for example, equal to a first operating voltage Vg1). A display grayscale of the pixel unit P is determined by a duty cycle of the operating voltage Vg of the data signal D1, that is, the timing controller 101 adjusts a display grayscale by adjusting a duty cycle of an operating voltage Vg in each data signal. Exemplarily, taking the operating voltage Vg=0 V and the turn-off voltage Vd=5 V of the data signal, the turn-on voltage Vk=5 V and the blanking voltage Vs=3 V of the scanning signal as an example, ideally, when the light-emitting diode emits light, the anode receives the turn-on voltage Vk, and the cathode receives the operating voltage Vg and is pulled to 1 V. The light-emitting diode emits light based on the voltage difference between the anode and the cathode (that is, 5 V−1 V=4 V). However, since there is a parasitic capacitor Cp in a data line 202, and a voltage of the parasitic capacitor Cp is 0 V in an initial state, when scanning signals are used to perform progressive scanning, a turn-off voltage Vd of the data line 202 charges the parasitic capacitor Cp, so that there is a residual voltage Vx (Vx<Vd=5 V) across the parasitic capacitor Cp. Therefore, when the pixel unit P is scanned, after the cathode of the light-emitting diode receives the operating voltage Vg, the residual voltage Vx of the parasitic capacitor Cp needs to be released first to pull a potential of the parasitic capacitor Cp down to 0 V, so that a normal voltage difference of 4 V across the light-emitting diode can be generated. It can be understood that when there is a long blanking interval between the end of the scanning of the last line of a previous frame and the re-scanning of a first line of a current frame, and therefore, during this period, it takes a long time for a turn-off voltage Vd to charge a parasitic capacitor Cp, a parasitic capacitor Cp of each column on a first pixel unit row is more fully charged, that is, a residual voltage Vx of the parasitic capacitor Cp is higher. In this case, if a target grayscale value of the first pixel unit row is very small, for example, less than a grayscale value of 40, that is, a duty cycle of an operating voltage Vg of a data signal and received when the first pixel unit row is scanned is very small, in other words, duration of the operating voltage Vg is very short, the operating voltage Vg has not pulled down the potential of the parasitic capacitor Cp from the residual voltage Vx to 0 V before switching to the turn-off voltage Vd. In this way, a voltage difference across a light-emitting diode in the first pixel unit row is necessarily less than a normal voltage difference, and therefore, there may be a problem that the first row is dim.

In addition, when the LED display apparatus 10 displays a gradient picture (that is, a picture with gradually changing target grayscale values), there may be a problem that the gradient picture is dim. After theoretical analysis and experimental verification, it is found that the reason why the gradient picture is dim is as follows: Duration of an operating voltage Vg of a data signal corresponding to the gradient picture gradually becomes longer. Therefore, in an entire process of displaying the gradient picture, a discharge time of the parasitic capacitor Cp of the data line 202 also gradually increasingly changes, and finally reaches a balanced state of charge and discharge. A luminance of the light-emitting diode is less and less affected by the parasitic capacitor Cp, and finally the luminance reaches an ideal state. Therefore, before the luminance of the light-emitting diode reaches the ideal state, the luminance of the gradient picture may be lower than target luminance, resulting in the loss of details in a dim low-grayscale part, and causing a problem that the gradient picture is not detailed enough.

Figure 3:
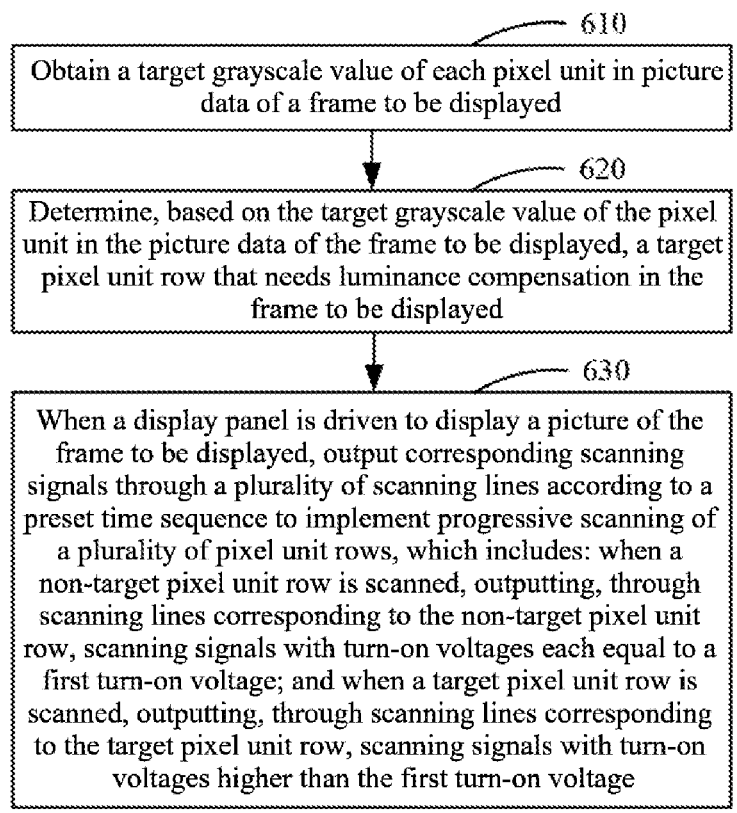
FIG. 3 is a schematic flowchart of a display panel driving method according to an embodiment of the present disclosure.

Referring to FIG. 3, to solve a problem that some low grayscale areas in an existing LED display apparatus is displayed dimly, the present disclosure provides a display panel driving method, and the display panel driving method is used to drive the display panel 200 for displaying. The display panel driving method can be executed by a drive circuit. The drive circuit may be the aforementioned drive circuit 100, or a drive circuit 100' described later, or another drive circuit. The display panel driving method includes the following operations.

In step 610: obtain a target grayscale value of each pixel unit P in picture data of a frame to be displayed.

In step 620: determine, based on the target grayscale value of the pixel unit P in the picture data of the frame to be displayed, a target pixel unit row that needs luminance compensation in the frame to be displayed.

In step 630: when the display panel 200 is driven to display a picture of the frame to be displayed, output corresponding scanning signals through the plurality of scanning lines 201 according to a preset time sequence to implement progressive scanning of a plurality of pixel unit rows, which includes: when a non-target pixel unit row is scanned, output, through scanning lines 201 corresponding to the non-target pixel unit row, scanning signals with turn-on voltages Vk each equal to a first turn-on voltage Vk1; and when a target pixel unit row is scanned, output, through scanning lines 201 corresponding to the target pixel unit row, scanning signals with turn-on voltages Vk higher than the first turn-on voltage Vk1.

The non-target pixel unit row is a pixel unit row other than the target pixel unit row.

According to the display panel driving method provided in the present disclosure, the target pixel unit row that needs luminance compensation in the frame to be displayed is determined based on the target grayscale value of the pixel unit P in the picture data of the frame to be displayed, and when a target pixel unit row is scanned, scanning signals with turn-on voltages Vk higher than the first turn-on voltage Vk1 are output through scanning lines 201 corresponding to the target pixel unit row. In this way, without changing the timing of data signals, a voltage difference across a light-emitting diode in a pixel unit in a low grayscale area is increased by increasing the turn-on voltage Vk, thereby increasing the luminance of the target pixel unit row, and further avoiding a problem that a low grayscale area in a displayed picture is displayed dimly. This solution is simple and has good luminance compensation effects.

Figure 4:
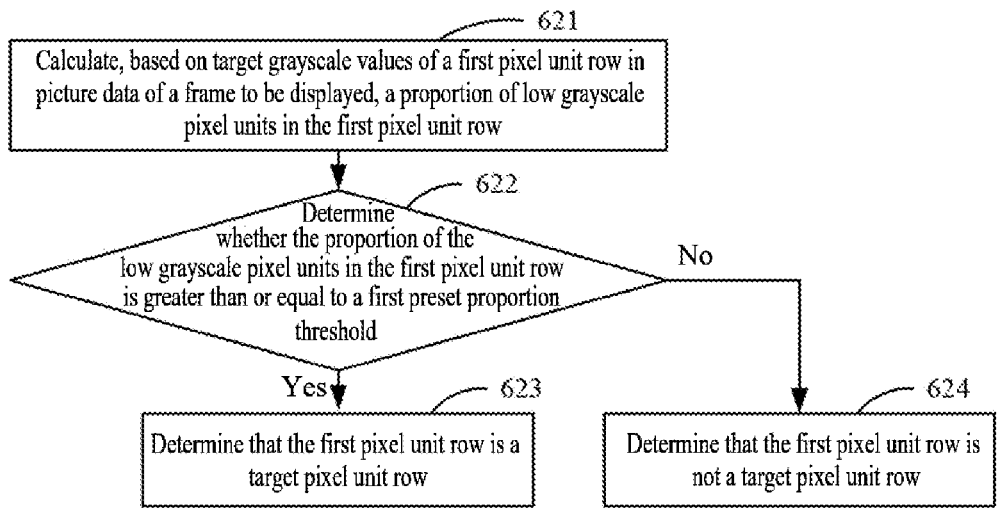
FIG. 4 is a first detailed flowchart of step 620 in FIG. 3.

Referring to FIG. 4, in an implementation, step 620 specifically includes the following steps.

In step 621: calculate, based on target grayscale values of a first pixel unit row in the picture data of the frame to be displayed, a proportion of low grayscale pixel units in the first pixel unit row.

The low grayscale pixel unit is a pixel unit with a target grayscale value less than a preset low grayscale threshold.

In step 622: determine whether the proportion of the low grayscale pixel units in the first pixel unit row is greater than or equal to a first preset proportion threshold.

If the proportion of the low grayscale pixel units in the first pixel unit row is greater than or equal to the first preset proportion threshold, step 623 is performed, and if the proportion of the low grayscale pixel units in the first pixel unit row is less than the first preset proportion threshold, step 624 is performed.

In step 623: determine that the first pixel unit row is a target pixel unit row.

In step 624: determine that the first pixel unit row is not a target pixel unit row.

It can be understood that increasing a turn-on voltage Vk of a scanning signal may inevitably increase power consumption of the display panel 200. However, as mentioned above, the problem that the first row is dim easily occurs when the first pixel unit row in the existing LED display apparatus is displaying a low-grayscale picture, and when the proportion of the low grayscale pixel units in the first pixel unit row is relatively low, the human eye cannot easily perceive the phenomenon of low luminance, and luminance compensation may not be performed in this case. Therefore, the power consumption of the display panel 200 may be reduced by controlling, based on the proportion of the low grayscale pixel units in the first pixel unit row, whether to perform luminance compensation on the first row. Exemplarily, the preset low grayscale threshold is a grayscale value of 40, and the first preset proportion threshold is 80%. Then, a turn-on voltage Vk of a first row of scanning signals can be increased only when a proportion of pixel units with target grayscale values less than the grayscale value of 40 is greater than or equal to 80% in the first pixel unit row, which can avoid the problem that the first row is dim easily occurs and reduce the power consumption.

Figure 5:
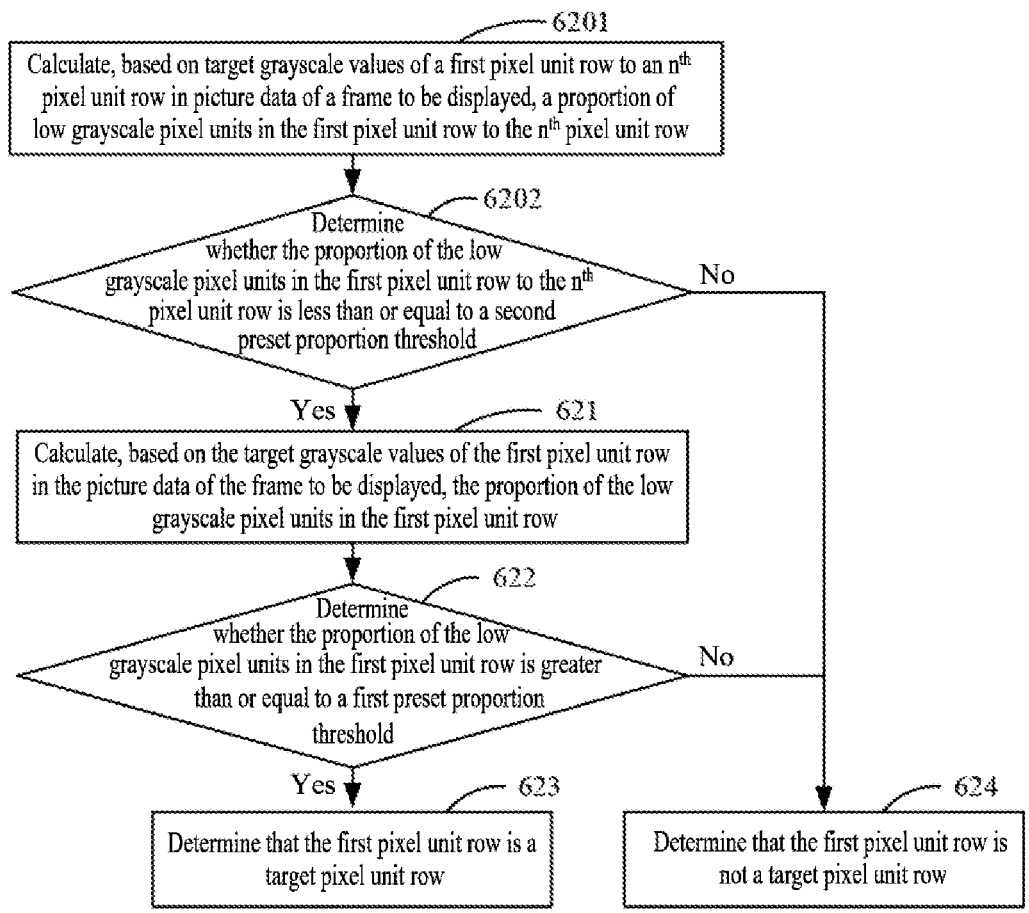
FIG. 5 is a second detailed flowchart of step 620 in FIG. 3.

Referring to FIG. 5, in another implementation, step 620 specifically includes the following steps:

In step 6201: calculate, based on target grayscale values of the first pixel unit row to an $n^{th}$ pixel unit row in the picture data of the frame to be displayed, a proportion of low grayscale pixel units in the first pixel unit row to the $n^{th}$ pixel unit row, where n is an integer greater than 1.

In step 6202: determine whether the proportion of the low grayscale pixel units in the first pixel unit row to the $n^{th}$ pixel unit row is less than or equal to a second preset proportion threshold, where if the proportion of the low grayscale pixel units in the first pixel unit row to the $n^{th}$ pixel unit row is less than or equal to the second preset proportion threshold, step 621 is performed; otherwise, step 624 is performed.

In step 621: calculate, based on the target grayscale values of the first pixel unit row in the picture data of the frame to be displayed, the proportion of the low grayscale pixel units in the first pixel unit row.

In step 622: determine whether the proportion of the low grayscale pixel units in the first pixel unit row is greater than or equal to a first preset proportion threshold.

If the proportion of the low grayscale pixel units in the first pixel unit row is greater than or equal to the first preset proportion threshold, step 623 is performed, and if the proportion of the low grayscale pixel units in the first pixel unit row is less than the first preset proportion threshold, step 624 is performed.

In step 623: determine that the first pixel unit row is a target pixel unit row; and In step 624: determine that the first pixel unit row is not a target pixel unit row.

It should be noted that it is found through experiments that if the overall picture of the frame to be displayed is low-grayscale, the human eye is less sensitive to a dim low-grayscale picture. Specifically, for example, when the target grayscale values of the first pixel unit row to the $n^{th}$ pixel unit row are all low grayscale values, it is difficult for the human eye to perceive the phenomenon that the first row is dim, and luminance compensation may not be performed in this case. Therefore, the power consumption of the display panel 200 may be further reduced by controlling, with reference to the proportion of the low grayscale pixel units in the first n rows of the display panel 200 and based on the proportion of the low grayscale pixel units in the first pixel unit row, whether to perform luminance compensation on the first row. Exemplarily, n is 50, the preset low grayscale threshold is a grayscale value of 40, the first preset proportion threshold is 80%, and the second preset proportion threshold is 90%. Then, a turn-on voltage Vk of a first row of scanning signals can be increased only when a proportion of pixel units with target grayscale values less than the grayscale value of 40 is less than 90% in the first 50 rows, and a proportion of pixel units with target grayscale values less than the grayscale value of 40 is greater than or equal to 80% in the first pixel unit row, which can avoid the problem that the first row is dim easily occurs and further reduce the power consumption.

Figure 6:
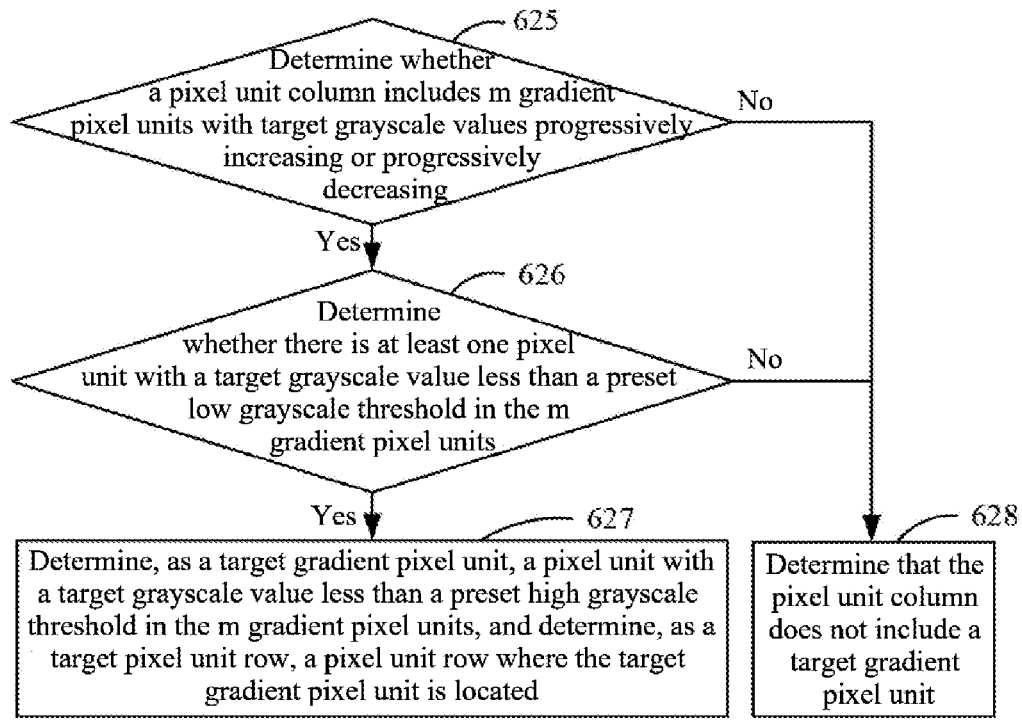
FIG. 6 is a third detailed flowchart of step 620 in FIG. 3.

Referring to FIG. 6, in still another implementation, step 620 specifically includes performing steps 625 to 628 for each pixel unit column in the picture data of the frame to be displayed, which are specifically as follows.

In step 625: determine whether the pixel unit column includes m gradient pixel units with target grayscale values progressively increasing or progressively decreasing.

If the pixel unit column includes m gradient pixel units with target grayscale values progressively increasing or progressively decreasing, step 626 is performed; otherwise, step 628 is performed.

In step 626: determine whether there is at least one pixel unit with a target grayscale value less than a preset low grayscale threshold in the m gradient pixel units, where m is a positive integer.

If at least one pixel unit with a target grayscale value less than the preset low grayscale threshold in the m gradient pixel units, step 627 is performed; otherwise, step 628 is performed.

In step 627: determine, as a target gradient pixel unit, a pixel unit with a target grayscale value less than a preset high grayscale threshold in the m gradient pixel units, and determine, as the target pixel unit row, a pixel unit row where the target gradient pixel unit is located, where the preset high grayscale threshold is greater than the preset low grayscale threshold.

In step 628: determine that the pixel unit column does not include a target gradient pixel unit.

It may be understood that if a value of m is too small, that is, a range of the gradient picture is too small, it is difficult for the human eye to perceive a dim gradient picture, and there is no need to perform luminance compensation. Therefore, a range of m is preferably 50 to 200.

In order to facilitate the understanding of a method of determining a target gradient pixel unit and a target pixel unit row, the following is described by using an example in which the preset low grayscale threshold is a grayscale value of 40, and the preset high grayscale threshold is a grayscale value of 128. For example, target grayscale values of a first pixel unit to a $60^{th}$ pixel unit of a first pixel unit column to a $40^{th}$ pixel unit column are progressively increased from a grayscale value of 15 to a grayscale value of 140, and target grayscale values of a $51^{st}$ pixel unit to a $60^{th}$ pixel unit each are greater than a grayscale value of 128. Then, pixel units in an area formed by a first column to a $40^{th}$ column and a first row to a $51^{st}$ row are target gradient pixel units, and a first pixel unit row to a $51^{st}$ pixel unit row are target pixel unit rows.

In other implementations, for each pixel unit column, a pixel unit with a target grayscale value less than the preset low grayscale threshold can be found first, and then it is determined whether the pixel unit with a target grayscale value less than the preset low grayscale threshold is in the m gradient pixel units, a pixel unit with a target grayscale value less than the preset high grayscale threshold in the m gradient pixel units is determined as a target gradient pixel unit, and a pixel unit row where the target gradient pixel unit is located is determined as the target pixel unit row. That is, the present disclosure does not limit the order of the steps of determining the target gradient pixel unit and the target pixel unit row.

It should be noted that it is found through experiments that if the target grayscale values of the m gradient pixel units each are greater than the preset low grayscale threshold, the phenomenon of a dim gradient picture may not occur, and there is no need to perform luminance compensation. Specifically, when a target grayscale value of a pixel unit in the gradient picture is greater than the preset high grayscale threshold, even if a parasitic capacitor Cp has an influence, an operating voltage Vg of a data signal can pull down a residual voltage Vx of the parasitic capacitor Cp because duration of the operating voltage Vg is long enough, so that the accuracy of luminance of the picture can be ensured, and there is no need to perform luminance compensation. Therefore, determining the target gradient pixel unit and the target pixel unit row based on a relationship between target grayscale values of the m gradient pixel units and each of the preset high grayscale threshold and the preset low grayscale threshold can improve the accuracy of luminance compensation of the gradient picture, and can also reduce the power consumption of the display panel 200.

Figure 7:
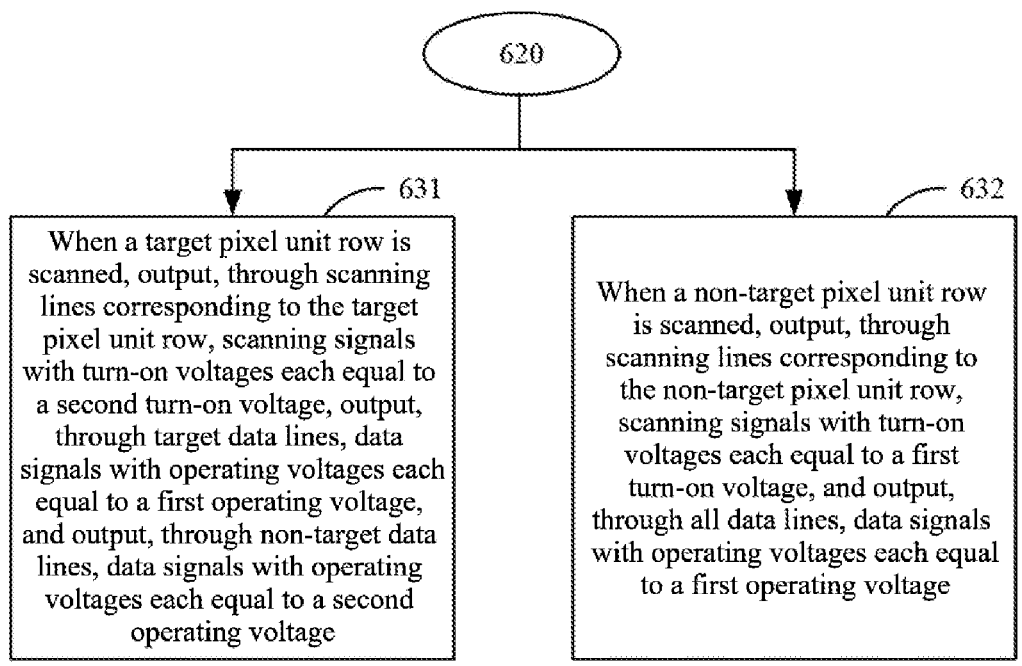
FIG. 7 is a first detailed flowchart of step 630 in FIG. 3.

Further, referring to FIG. 7, in this implementation, step 630 specifically includes the following steps:

In step 631: when a target pixel unit row is scanned, output, through scanning lines 201 corresponding to the target pixel unit row, scanning signals with turn-on voltages Vk each equal to a second turn-on voltage Vk2, output, through target data lines, data signals with operating voltages Vg each equal to a first operating voltage Vg1, and output, through non-target data lines, data signals with operating voltages Vg each equal to a second operating voltage Vg2.

The second turn-on voltage Vk2 is higher than the first turn-on voltage Vk1, the first operating voltage Vg1 is lower than the second operating voltage Vg2, the target data line is a data line corresponding to a gradient pixel unit in the target pixel unit row, and the non-target data line is a data line other than the target data line.

In step 632: when a non-target pixel unit row is scanned, output, through scanning lines 201 corresponding to the non-target pixel unit row, scanning signals with turn-on voltages Vk each equal to the first turn-on voltage Vk1, and output, through all the data lines 202, data signals with operating voltages Vg each equal to the first operating voltage Vg1.

Figure 8:
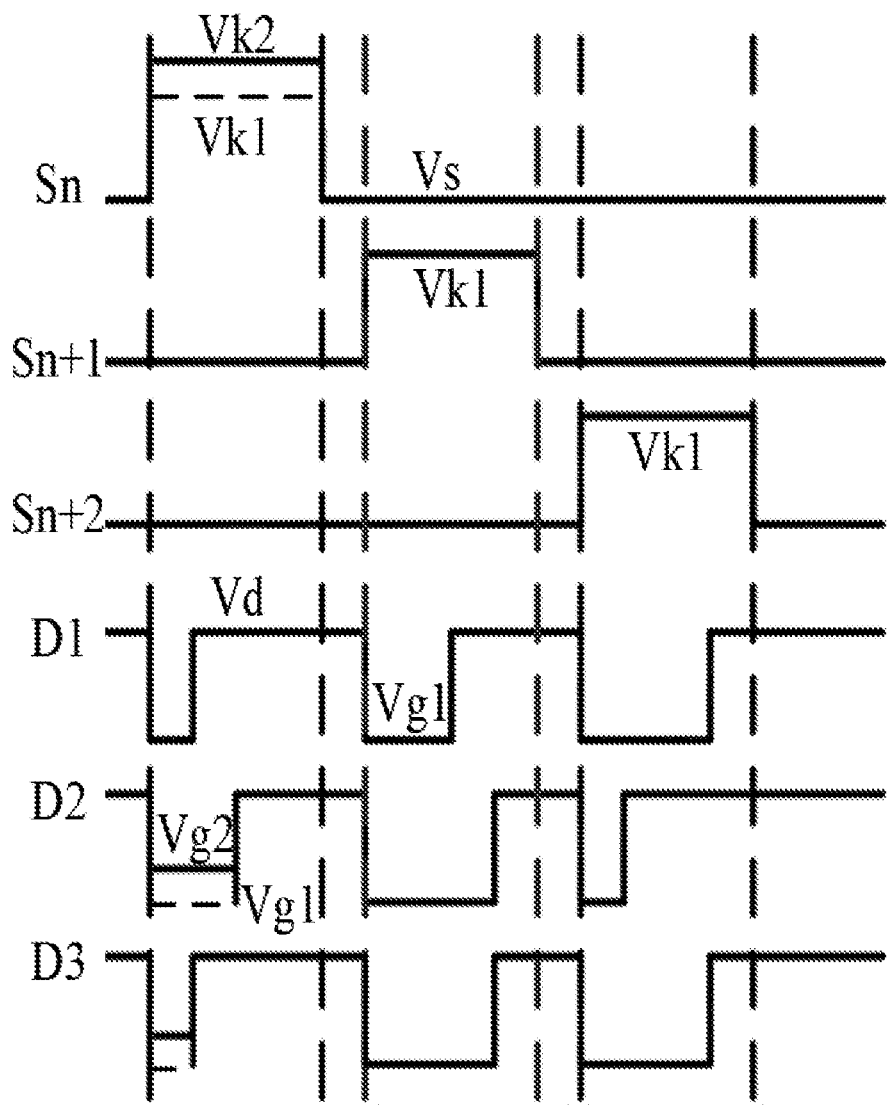
FIG. 8 is another timing diagram of scanning signals and data signals according to an embodiment of the present disclosure.

Preferably, a difference between the first turn-on voltage Vk1 and the second turn-on voltage Vk2 is defined as a first difference, a difference between the second operating voltage Vg2 and the first operating voltage Vg1 is defined as a second difference value, and the first difference is equal to the second difference. Exemplarily, as shown in FIG. 8, a value of the first turn-on voltage Vk1 is 5 V, a value of the second turn-on voltage Vk2 is 6 V, a value of the first operating voltage Vg1 is 0 V, and a value of the second operating voltage Vg2 is 1 V. If a pixel unit in the $n^{th}$ row and the first column is a target gradient pixel unit, the $n^{th}$ pixel unit row is a target pixel unit row, the $(n+1)^{th}$ pixel unit row and the $(n+2)^{th}$ pixel unit row are non-target pixel unit rows, the first data line column is a target data line, and the second data line column and the third data line column are non-target data lines. Then, the turn-on voltage Vk of the $n^{th}$ pixel unit row is increased to the second turn-on voltage Vk2, and the turn-on voltage Vk of the $(n+1)^{th}$ pixel unit row and the $(n+2)^{th}$ pixel unit row is maintained at Vk1. When n pixel unit rows are scanned, an operating voltage Vg of a first pixel unit column is maintained at the first operating voltage Vg1, and operating voltages Vg of a second pixel unit column and a third pixel unit column are increased to the second operating voltage Vg2. In this way, it can be ensured that a voltage difference across light-emitting diodes in non-target gradient pixel units in the target pixel unit row remains unchanged, that is, luminance remains unchanged, thereby implementing accurate compensation for the target gradient pixel units and avoiding a phenomenon that the non-target gradient pixel units are too bright.

Figure 9:
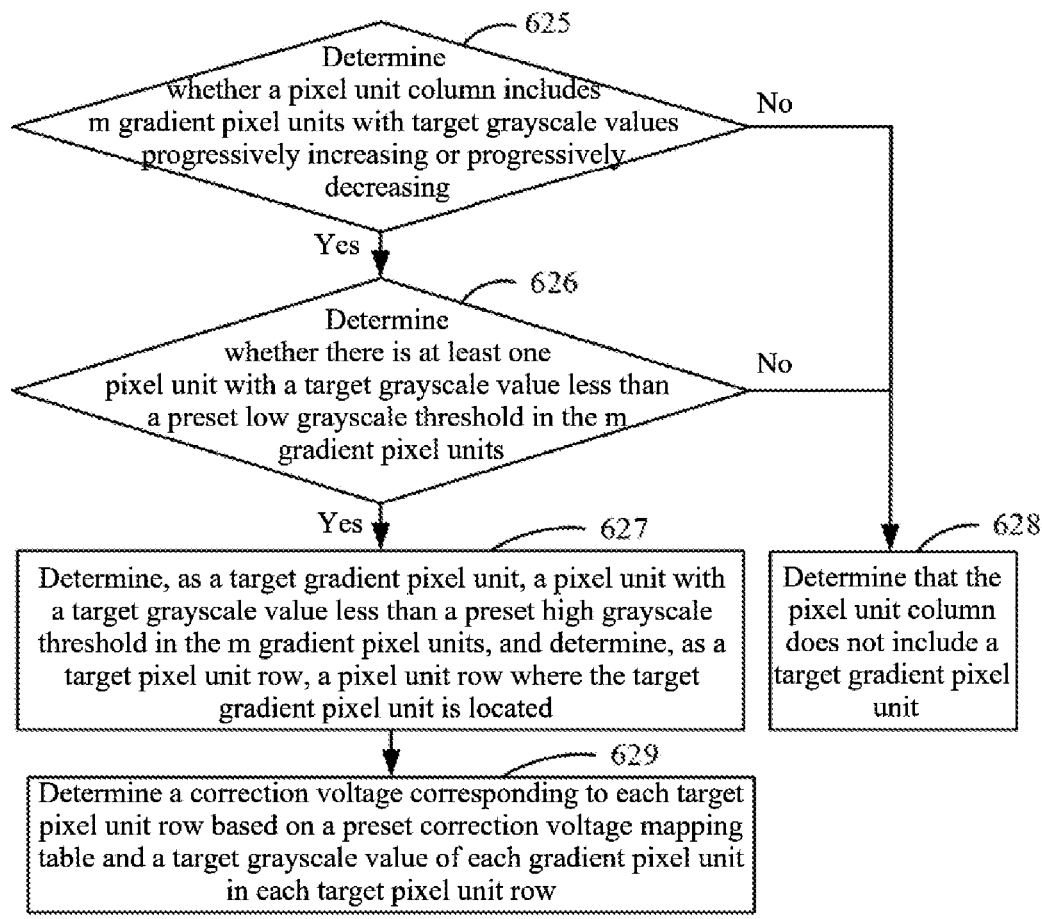
FIG. 9 is a fourth detailed flowchart of step 620 in FIG. 3.

Optionally, in yet another implementation, referring to FIG. 9, step 620 specifically includes performing steps 625 to 629 for each pixel unit column in the picture data of the frame to be displayed, which are specifically as follows.

In step 625: determine whether the pixel unit column includes m gradient pixel units with target grayscale values progressively increasing or progressively decreasing.

If the pixel unit column includes m gradient pixel units with target grayscale values progressively increasing or progressively decreasing, step 626 is performed; otherwise, step 628 is performed.

In step 626: determine whether there is at least one pixel unit with a target grayscale value less than a preset low grayscale threshold in the m gradient pixel units, where m is a positive integer.

If at least one pixel unit with a target grayscale value less than the preset low grayscale threshold in the m gradient pixel units, step 627 is performed; otherwise, step 628 is performed.

In step 627: determine, as a target gradient pixel unit, a pixel unit with a target grayscale value less than a preset high grayscale threshold in the m gradient pixel units, and determine, as the target pixel unit row, a pixel unit row where the target gradient pixel unit is located, where the preset high grayscale threshold is greater than the preset low gray scale threshold.

In step 628: determine that the pixel unit column does not include a target gradient pixel unit.

In step 629: determine a correction voltage corresponding to each target pixel unit row based on a preset correction voltage mapping table and a target grayscale value of each gradient pixel unit in each target pixel unit row, where a mapping relationship between a plurality of target grayscale values and a plurality of correction voltages is recorded in the preset correction voltage mapping table.

Figure 10:
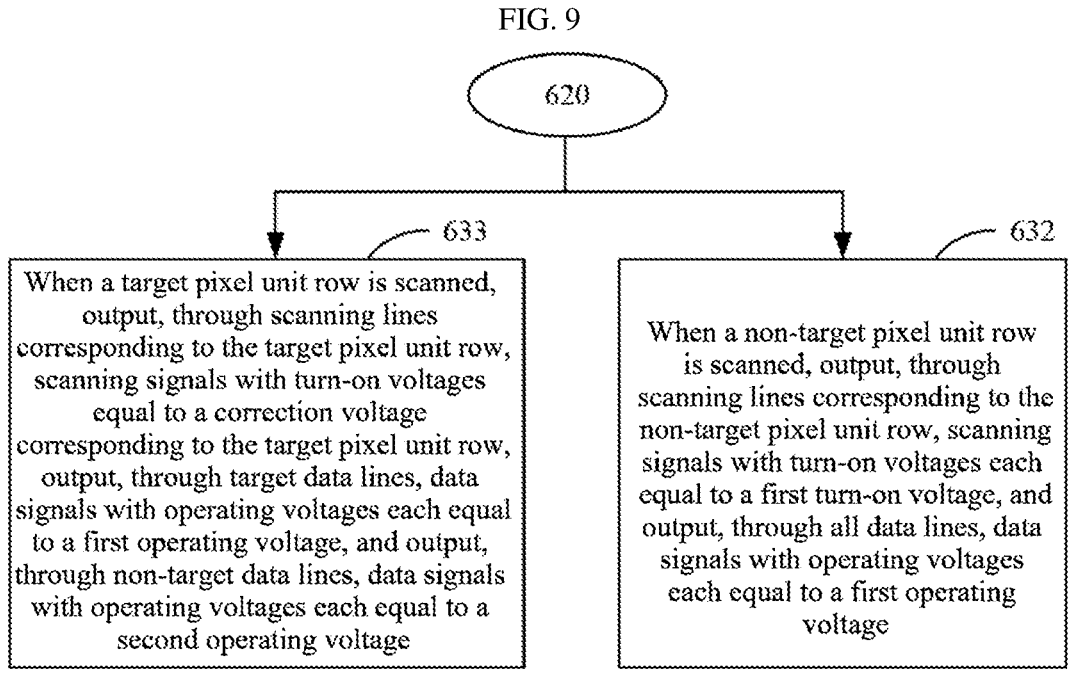
FIG. 10 is a second detailed flowchart of step 630 in FIG. 3.

Further, in this embodiment, referring to FIG. 10, step 630 specifically includes the following steps.

In step 633: when a target pixel unit row is scanned, output, through scanning lines corresponding to the target pixel unit row, scanning signals with turn-on voltages Vk equal to a correction voltage corresponding to the target pixel unit row, output, through target data lines, data signals with operating voltages Vg each equal to a first operating voltage Vg1, and output, through non-target data lines, data signals with operating voltages Vg each equal to a second operating voltage Vg2, where the second turn-on voltage Vk2 is higher than the first turn-on voltage Vk1, the first operating voltage Vg1 is lower than the second operating voltage Vg2, the target data line is a data line corresponding to a gradient pixel unit in the target pixel unit row, and the non-target data line is a data line other than the target data line.

In step 632: when a non-target pixel unit row is scanned, output, through scanning lines 201 corresponding to the non-target pixel unit row, scanning signals with turn-on voltages Vk each equal to the first turn-on voltage Vk1, and output, through all the data lines 202, data signals with operating voltages Vg each equal to the first operating voltage Vg1.

Figure 11:
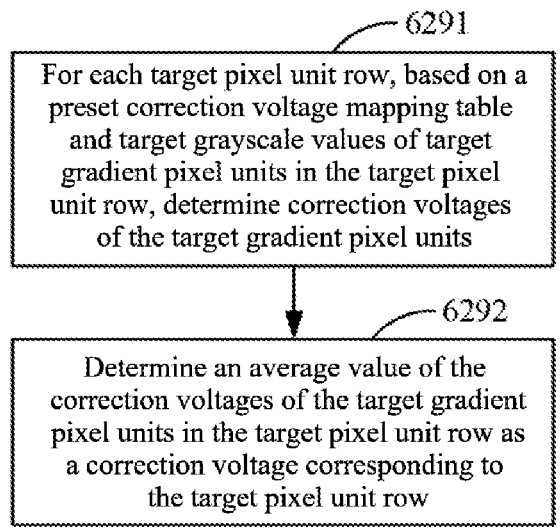
FIG. 11 is a detailed flowchart of step 629 in FIG. 9.

Further, referring to FIG. 11, step 629 specifically includes the following steps.

In step 6291: for each target pixel unit row, based on the preset correction voltage mapping table and target grayscale values of target gradient pixel units in the target pixel unit row, determine correction voltages of the target gradient pixel units.

In step 6292: determine an average value of the correction voltages of the target gradient pixel units in the target pixel unit row as a correction voltage corresponding to the target pixel unit row.

It should be noted that, in the previous implementation, turn-on voltages Vk of scanning signals output to all target pixel unit rows each are equal to the second turn-on voltage Vk2, so that compensation may be uneven, that is, some areas in the gradient picture are too bright due to over-compensation, and some areas are dim due to under-compensation. In this embodiment, a correction voltage of each target pixel unit row is determined based on the average value of the correction voltages of the target gradient pixel units in the target pixel unit row, and when a target pixel unit row is scanned, scanning signals with turn-on voltages equal to a correction voltage corresponding to the target pixel unit row are output through scanning lines corresponding to the target pixel unit row. In this way, compensation can be performed more accurately according to different luminance requirements, and the display effects are better.

Optionally, the preset correction voltage mapping table can be obtained through experiments. For example, turn-on voltages Vk of scanning signals output to all target pixel unit rows each are first controlled to be equal to the second turn-on voltage Vk2, then a charge coupled device (CCD) camera is used to take pictures and analyze the picture quality of the displayed picture that is compensated, and then the picture quality is analyzed for compensation effects for pixel units with different target grayscale values after the turn-on voltages Vk are increased to the second turn-on voltage Vk2. For example, when a pixel unit with a target grayscale value of 120 is driven by the second turn-on voltage Vk2, the actually displayed grayscale value may have reached a grayscale value of 140, and therefore, it needs to be reduced by 20 to reach a grayscale value of 120. In this way, for example, by a plurality of times of data analysis, the correction voltage corresponding to each target grayscale value can be obtained, for example, the target grayscale value is a grayscale value of 120, and its corresponding correction voltage is 5.4 V; and the target grayscale value is a grayscale value of 100, and its corresponding correction voltage is 5.5 V.

Figure 12:
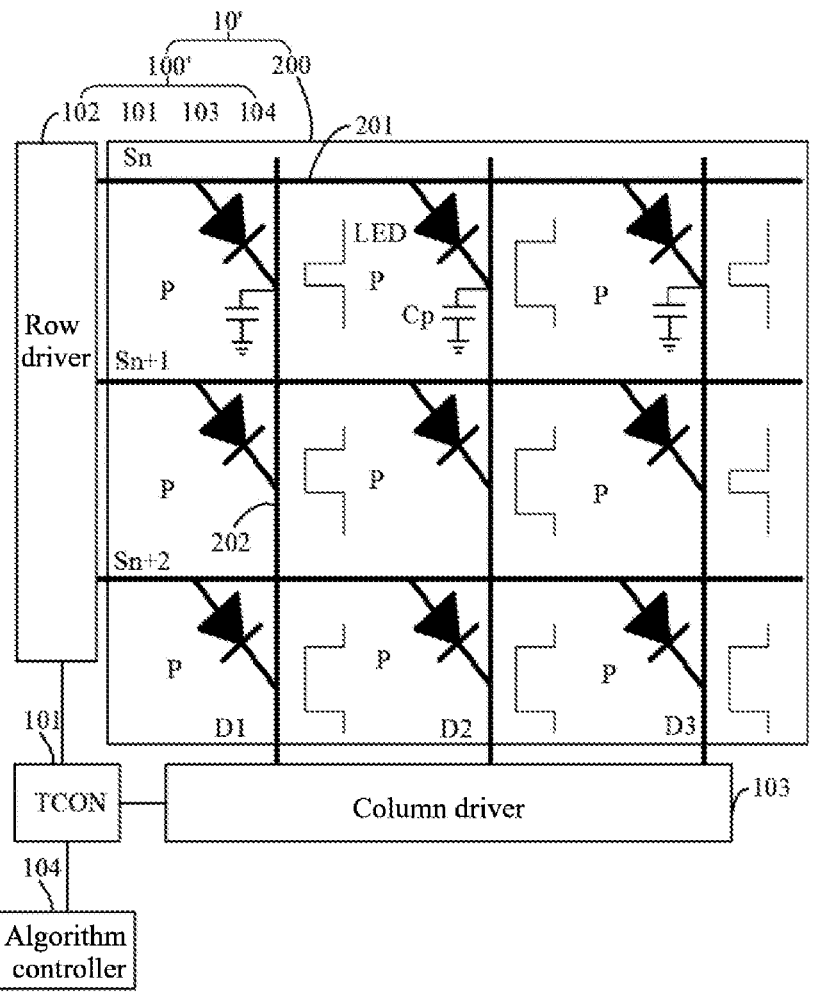
FIG. 12 is a schematic diagram of a structure of a LED display apparatus according to an embodiment of the present disclosure.

Referring to FIG. 12, the present disclosure further provides a drive circuit 100'. The drive circuit 100' is configured to drive the display panel 200 for displaying, the display panel 200 includes a plurality of scanning lines 201 extending along a row direction, a plurality of data lines 202 extending along a column direction, and a plurality of pixel units P arranged in an array and defined by intersections of the plurality of scanning lines 201 and the plurality of data lines 202.

The drive circuit includes a row driver 102, an algorithm controller 104, and a timing controller 101 separately electrically connected to the row driver 102 and the algorithm controller 104, and the timing controller 101 is configured to control the row driver 102 to output corresponding scanning signals to corresponding pixel unit rows through scanning lines 201.

The algorithm controller 104 is configured to obtain a target grayscale value of each pixel unit P in picture data of a frame to be displayed, determine, based on the target grayscale value of the pixel unit P in the picture data of the frame to be displayed, a target pixel unit row that needs luminance compensation in the frame to be displayed, and feed the target pixel unit row back to the timing controller 101.

In a process of the display panel 200 displaying a picture of the frame to be displayed, the timing controller 101 is configured to control the row driver 102 to output corresponding scanning signals through the plurality of scanning lines 201 according to a preset time sequence to implement progressive scanning of a plurality of pixel unit rows. When the drive circuit 100' scans a non-target pixel unit row, the timing controller 101 is specifically configured to control the row driver 102 to output, through scanning lines 201 corresponding to the non-target pixel unit row, scanning signals with turn-on voltages Vk each equal to a first turn-on voltage Vk1. When the drive circuit 100' scans a target pixel unit row, the timing controller 101 is specifically configured to control the row driver 102 to output, through scanning lines 201 corresponding to the target pixel unit row, scanning signals with turn-on voltages Vk higher than the first turn-on voltage Vk1. The non-target pixel unit row is a pixel unit row other than the target pixel unit row.

It should be noted that, the algorithm controller 104 may determine a target pixel unit row that needs luminance compensation in the frame to be displayed by performing the step of determining the target pixel unit row in any one of the above embodiments. For example, in one implementation, the algorithm controller 104 is configured to perform step 620, and in another implementation, the algorithm controller 104 is configured to perform steps 621 to 624. In another implementation, the algorithm controller 104 is configured to perform steps 6201 and 6202 and steps 621 to 624. In still another implementation, the algorithm controller 104 is configured to perform steps 625 to 628. In yet another implementation, the algorithm controller 104 is configured to perform steps 625 to 629 and steps 6291 and 6292. The timing controller 101 may perform the step of driving the display panel 200 to display a picture of the frame to be displayed in any one of the above embodiments. For example, in one implementation, the timing controller 101 is configured to perform step 630; in another implementation, the timing controller 101 is configured to perform steps 631 and 632; and in yet another implementation, the timing controller 101 is configured to perform steps 632 and 633.

Optionally, in another implementation, the algorithm controller 104 may be integrated in the timing controller 101, that is, all steps in any one of the above implementations are performed by the timing controller 101. In this way, there is no need to add additional circuit elements, which can reduce costs.

Referring to FIG. 12 again, based on the same inventive concept, the present disclosure further provides an LED display apparatus 10', and the LED display apparatus 10' includes the foregoing drive circuit 100' and a display panel 200, where the drive circuit 100' is electrically connected to the display panel 200, and the drive circuit 100' is configured to drive the display panel 200.

Exemplarily, the LED display apparatus 10' may be an electronic device with a display panel, such as a television, a computer, a smart phone, a tablet computer, and a smart watch.

According to the drive circuit 100' and the LED display apparatus 10' provided in the present disclosure, the target pixel unit row that needs luminance compensation in the frame to be displayed is determined based on the target grayscale value of the pixel unit P in the picture data of the frame to be displayed, and when a target pixel unit row is scanned, scanning signals with turn-on voltages Vk higher than the first turn-on voltage Vk1 are output through scanning lines 201 corresponding to the target pixel unit row. In this way, without changing the timing of data signals, a voltage difference across a light-emitting diode in a pixel unit in a low grayscale area is increased by increasing the turn-on voltage Vk, thereby increasing the luminance of the target pixel unit row, and further avoiding a problem that a low grayscale area in a displayed picture is displayed dimly. This solution is simple and has good luminance compensation effects.

The main objective of the present disclosure is to propose a display panel driving method, a drive circuit, and an LED display apparatus, aiming at solving a problem that some low grayscale areas in an existing Mini LED display apparatus are displayed dimly.

To achieve the above objective, a first aspect of the present disclosure provides driving method, where the display panel driving method is used to drive a display panel for displaying, the display panel includes a plurality of scanning lines extending along a row direction, a plurality of data lines extending along a column direction, a plurality of pixel units arranged in an array and defined by intersections of the plurality of scanning lines and the plurality of data lines, and each scanning line is used to output a corresponding scanning signal to a corresponding pixel unit row; the display panel driving method includes: obtaining a target grayscale value of each pixel unit in picture data of a frame to be displayed; determining, based on the target grayscale value of the pixel unit in the picture data of the frame to be displayed, a target pixel unit row that needs luminance compensation in the frame to be displayed; and when the display panel is driven to display a picture of the frame to be displayed, outputting corresponding scanning signals through the plurality of scanning lines according to a preset time sequence to implement progressive scanning of a plurality of pixel unit rows, which includes: when a non-target pixel unit row is scanned, outputting, through scanning lines corresponding to the non-target pixel unit row, scanning signals with turn-on voltages each equal to a first turn-on voltage; and when a target pixel unit row is scanned, outputting, through scanning lines corresponding to the target pixel unit row, scanning signals with turn-on voltages higher than the first turn-on voltage, where the non-target pixel unit row is a pixel unit row other than the target pixel unit row.

According to the display panel driving method provided in the present disclosure, the target pixel unit row that needs luminance compensation in the frame to be displayed is determined based on the target grayscale value of the pixel unit in the picture data of the frame to be displayed, and when a target pixel unit row is scanned, scanning signals with turn-on voltages higher than the first turn-on voltage are output through scanning lines corresponding to the target pixel unit row. In this way, without changing the timing of data signals, a voltage difference across a light-emitting diode in each pixel unit in a low grayscale area can be increased by increasing the turn-on voltage, thereby increasing the luminance of the target pixel unit row, and further avoiding a problem that a low grayscale area in a displayed picture is displayed dimly. This solution is simple and has good luminance compensation effects.

Optionally, the determining, based on the target grayscale value of the pixel unit in the picture data of the frame to be displayed, a target pixel unit row that needs luminance compensation in the frame to be displayed includes: calculating, based on target grayscale values of a first pixel unit row in the picture data of the frame to be displayed, a proportion of low grayscale pixel units in the first pixel unit row, where the low grayscale pixel unit is a pixel unit with a target grayscale value less than a preset low grayscale threshold; determining whether the proportion of the low grayscale pixel units in the first pixel unit row is greater than or equal to a first preset proportion threshold; if the proportion of the low grayscale pixel units in the first pixel unit row is greater than or equal to the first preset proportion threshold, determining that the first pixel unit row is a target pixel unit row; and if the proportion of the low grayscale pixel units in the first pixel unit row is less than the first preset proportion threshold, determining that the first pixel unit row is not a target pixel unit row.

Optionally, before the calculating, based on target grayscale values of a first pixel unit row in the picture data of the frame to be displayed, a proportion of low grayscale pixel units in the first pixel unit row, the display panel driving method further includes: calculating, based on target grayscale values of the first pixel unit row to an $n^{th}$ pixel unit row in the picture data of the frame to be displayed, a proportion of low grayscale pixel units in the first pixel unit row to the $n^{th}$ pixel unit row, where n is an integer greater than 1; and determining whether the proportion of the low grayscale pixel units in the first pixel unit row to the $n^{th}$ pixel unit row is less than or equal to a second preset proportion threshold; and the calculating, based on target grayscale values of a first pixel unit row in the picture data of the frame to be displayed, a proportion of low grayscale pixel units in the first pixel unit row includes: if the proportion of the low grayscale pixel units in the first pixel unit row to the $n^{th}$ pixel unit row is less than or equal to the second preset proportion threshold, calculating, based on the target grayscale values of the first pixel unit row in the picture data of the frame to be displayed, the proportion of the low grayscale pixel units in the first pixel unit row.

Optionally, the determining, based on the target grayscale value of the pixel unit in the picture data of the frame to be displayed, a target pixel unit row that needs luminance compensation in the frame to be displayed includes: for each pixel unit column in the picture data of the frame to be displayed, determining whether the pixel unit column includes m gradient pixel units with target grayscale values progressively increasing or progressively decreasing; if the pixel unit column includes m gradient pixel units with target grayscale values progressively increasing or progressively decreasing, determining whether there is at least one pixel unit with a target grayscale value less than a preset low grayscale threshold in the m gradient pixel units, where m is a positive integer; and if there is at least one pixel unit with a target grayscale value less than the preset low grayscale threshold in the m gradient pixel units, determining, as a target gradient pixel unit, a pixel unit with a target grayscale value less than a preset high grayscale threshold in the m gradient pixel units, and determining, as the target pixel unit row, a pixel unit row where the target gradient pixel unit is located, where the preset high grayscale threshold is greater than the preset low grayscale threshold.

Optionally, each data line is used to output a corresponding data signal to a corresponding pixel unit column; and the outputting, through scanning lines corresponding to the target pixel unit row, scanning signals with turn-on voltages higher than the first turn-on voltage includes: outputting, through the scanning lines corresponding to the target pixel unit row, scanning signals with turn-on voltages each equal to a second turn-on voltage, where the second turn-on voltage is higher than the first turn-on voltage; and outputting, through target data lines, data signals with operating voltages each equal to a first operating voltage, and outputting, through non-target data lines, data signals with operating voltages each equal to a second operating voltage, where the first operating voltage is lower than the second operating voltage, the target data line is a data line corresponding to a target gradient pixel unit in the target pixel unit row, and the non-target data line is a data line other than the target data line.

Optionally, after the determining, as a target gradient pixel unit, a pixel unit with a target grayscale value less than a preset high grayscale threshold in the m gradient pixel units, and determining, as the target pixel unit row, a pixel unit row where the target gradient pixel unit is located, the display panel driving method further includes: determining a correction voltage corresponding to each target pixel unit row based on a preset correction voltage mapping table and a target grayscale value of each target gradient pixel unit in each target pixel unit row, where a mapping relationship between a plurality of target grayscale values and a plurality of correction voltages is recorded in the preset correction voltage mapping table; and the outputting, through scanning lines corresponding to the target pixel unit row, scanning signals with turn-on voltages higher than the first turn-on voltage includes: outputting, through a scanning line corresponding to each target pixel unit row, a scanning signal with a turn-on voltage equal to a correction voltage corresponding to the target pixel unit row.

Optionally, the determining a correction voltage corresponding to each target pixel unit row based on a preset correction voltage mapping table and a target grayscale value of each target gradient pixel unit in each target pixel unit row includes: for each target pixel unit row, based on the preset correction voltage mapping table and target grayscale values of target gradient pixel units in the target pixel unit row, determining correction voltages of the target gradient pixel units; and determining an average value of the correction voltages of the target gradient pixel units in the target pixel unit row as a correction voltage corresponding to the target pixel unit row.

Optionally, the outputting, through scanning lines corresponding to the non-target pixel unit row, scanning signals with turn-on voltages each equal to a first turn-on voltage includes: outputting, through the scanning lines corresponding to the non-target pixel unit row, scanning signals with turn-on voltages each equal to the first turn-on voltage; and outputting, through all the data lines, data signals with operating voltages being the first operating voltage.

A second aspect of the present disclosure further provides a drive circuit, where the drive circuit is configured to drive a display panel for displaying, the display panel includes a plurality of scanning lines extending along a row direction, a plurality of data lines extending along a column direction, and a plurality of pixel units arranged in an array and defined by intersections of the plurality of scanning lines and the plurality of data lines, where the drive circuit includes a row driver, an algorithm controller, and a timing controller separately electrically connected to the row driver and the algorithm controller, where the timing controller is configured to control the row driver to output corresponding scanning signals to corresponding pixel unit rows through scanning lines; the algorithm controller is configured to obtain a target grayscale value of each pixel unit in picture data of a frame to be displayed, determine, based on the target grayscale value of the pixel unit in the picture data of the frame to be displayed, a target pixel unit row that needs luminance compensation in the frame to be displayed, and feed the target pixel unit row back to the timing controller; and in a process of the display panel displaying a picture of the frame to be displayed, the timing controller is configured to control the row driver to output corresponding scanning signals through the plurality of scanning lines according to a preset time sequence to implement progressive scanning of a plurality of pixel unit rows, where when the drive circuit scans a non-target pixel unit row, the timing controller is specifically configured to control the row driver to output, through scanning lines corresponding to the non-target pixel unit row, scanning signals with turn-on voltages each equal to a first turn-on voltage; and when the drive circuit scans a target pixel unit row, the timing controller is specifically configured to control the row driver to output, through scanning lines corresponding to the target pixel unit row, scanning signals with turn-on voltages higher than the first turn-on voltage, where the non-target pixel unit row is a pixel unit row other than the target pixel unit row.

A third aspect of the present disclosure further provides an LED display apparatus, and the LED display apparatus includes the foregoing drive circuit and a display panel, where the display panel is an LED display panel, the drive circuit is electrically connected to the display panel, and the drive circuit is configured to drive the display panel for displaying.

For those skilled in the art, it is apparent that the present disclosure is not limited to the details of the above-mentioned exemplary embodiments, and the present disclosure can be implemented in other specific forms without departing from the spirit or basic features of the present disclosure. Therefore, no matter from which point of view, the embodiments should all be regarded as exemplary and non-limiting. The scope of the present disclosure is defined by the appended claims rather than the above-mentioned description, and therefore it is intended that all changes which fall within the meaning and range of equivalents of the claims are embraced in the present disclosure. Any reference signs in the claims should not be construed as limiting the claims involved. In addition, it is apparent that the word "comprise/include" does not exclude other elements or steps, and the singular does not exclude the plural.

Although the embodiments of the present disclosure have been shown and described, those of ordinary skill in the art can understand that various changes, modifications, substitutions, and variations can be made to these embodiments without departing from the principles and spirit of the present disclosure. The scope of the present disclosure is defined by the claims and equivalents thereof.

What is claimed is:

1. A display panel driving method, wherein the display panel driving method is used to drive a display panel for displaying, the display panel comprises a plurality of scanning lines extending along a row direction, a plurality of data lines extending along a column direction, a plurality of pixel units arranged in an array and defined by intersections of the plurality of scanning lines and the plurality of data lines, and each scanning line is used to output a corresponding scanning signal to a corresponding pixel unit row, wherein the display panel driving method comprises:
obtaining a target grayscale value of each pixel unit in picture data of a frame to be displayed;
determining, based on the target grayscale value of the pixel unit in the picture data of the frame to be displayed, a target pixel unit row that needs luminance compensation in the frame to be displayed; and
when the display panel is driven to display a picture of the frame to be displayed, outputting corresponding scanning signals through the plurality of scanning lines according to a preset time sequence to implement progressive scanning of a plurality of pixel unit rows, which comprises: when a non-target pixel unit row is scanned, outputting, through scanning lines corresponding to the non-target pixel unit row, scanning signals with turn-on voltages each equal to a first turn-on voltage; and when a target pixel unit row is scanned, outputting, through scanning lines corresponding to the target pixel unit row, scanning signals with turn-on voltages higher than the first turn-on voltage, wherein the non-target pixel unit row is a pixel unit row other than the target pixel unit row.

2. The display panel driving method according to claim 1, wherein the determining, based on the target grayscale value of the pixel unit in the picture data of the frame to be displayed, a target pixel unit row that needs luminance compensation in the frame to be displayed comprises:
calculating, based on target grayscale values of a first pixel unit row in the picture data of the frame to be displayed, a proportion of low grayscale pixel units in the first pixel unit row, wherein the low grayscale pixel unit is a pixel unit with a target grayscale value less than a preset low grayscale threshold;
determining whether the proportion of the low grayscale pixel units in the first pixel unit row is greater than or equal to a first preset proportion threshold;
if the proportion of the low grayscale pixel units in the first pixel unit row is greater than or equal to the first preset proportion threshold, determining that the first pixel unit row is a target pixel unit row; and
if the proportion of the low grayscale pixel units in the first pixel unit row is less than the first preset proportion threshold, determining that the first pixel unit row is not a target pixel unit row.

3. The display panel driving method according to claim 2, wherein before the calculating, based on target grayscale values of a first pixel unit row in the picture data of the frame to be displayed, a proportion of low gray scale pixel units in the first pixel unit row, the display panel driving method further comprises:
calculating, based on target grayscale values of the first pixel unit row to an $n^{th}$ pixel unit row in the picture data of the frame to be displayed, a proportion of low grayscale pixel units in the first pixel unit row to the $n^{th}$ pixel unit row, wherein n is an integer greater than 1; and determining whether the proportion of the low grayscale pixel units in the first pixel unit row to the $n^{th}$ pixel unit row is less than or equal to a second preset proportion threshold; and the calculating, based on target grayscale values of a first pixel unit row in the picture data of the frame to be displayed, a proportion of low grayscale pixel units in the first pixel unit row comprises:

if the proportion of the low grayscale pixel units in the first pixel unit row to the $n^{th}$ pixel unit row is less than or equal to the second preset proportion threshold, calculating, based on the target grayscale values of the first pixel unit row in the picture data of the frame to be displayed, the proportion of the low grayscale pixel units in the first pixel unit row.

4. The display panel driving method according to claim 1, wherein the determining, based on the target grayscale value of the pixel unit in the picture data of the frame to be displayed, a target pixel unit row that needs luminance compensation in the frame to be displayed comprises:

for each pixel unit column in the picture data of the frame to be displayed, determining whether the pixel unit column comprises m gradient pixel units with target grayscale values progressively increasing or progressively decreasing;

if the pixel unit column comprises m gradient pixel units with target grayscale values progressively increasing or progressively decreasing, determining whether there is at least one pixel unit with a target grayscale value less than a preset low grayscale threshold in the m gradient pixel units, wherein m is a positive integer; and if there is at least one pixel unit with a target grayscale value less than the preset low grayscale threshold in the m gradient pixel units, determining, as a target gradient pixel unit, a pixel unit with a target grayscale value less than a preset high grayscale threshold in the m gradient pixel units, and determining, as the target pixel unit row, a pixel unit row where the target gradient pixel unit is located, wherein the preset high grayscale threshold is greater than the preset low grayscale threshold.

5. The display panel driving method according to claim 4, wherein each data line is used to output a corresponding data signal to a corresponding pixel unit column; and the outputting, through scanning lines corresponding to the target pixel unit row, scanning signals with turn-on voltages higher than the first turn-on voltage comprises:

outputting, through the scanning lines corresponding to the target pixel unit row, scanning signals with turn-on voltages each equal to a second turn-on voltage, wherein the second turn-on voltage is higher than the first turn-on voltage; and outputting, through target data lines, data signals with operating voltages each equal to a first operating voltage, and outputting, through non-target data lines, data signals with operating voltages each equal to a second operating voltage, wherein the first operating voltage is lower than the second operating voltage, the target data line is a data line corresponding to a target gradient pixel unit in the target pixel unit row, and the non-target data line is a data line other than the target data line.

6. The display panel driving method according to claim 4, wherein after the determining, as a target gradient pixel unit, a pixel unit with a target grayscale value less than a preset high grayscale threshold in the m gradient pixel units, and determining, as the target pixel unit row, a pixel unit row where the target gradient pixel unit is located, the display panel driving method further comprises:

determining a correction voltage corresponding to each target pixel unit row based on a preset correction voltage mapping table and a target grayscale value of each target gradient pixel unit in each target pixel unit row, wherein a mapping relationship between a plurality of target grayscale values and a plurality of correction voltages is recorded in the preset correction voltage mapping table; and the outputting, through scanning lines corresponding to the target pixel unit row, scanning signals with turn-on voltages higher than the first turn-on voltage comprises:

outputting, through a scanning line corresponding to each target pixel unit row, a scanning signal with a turn-on voltage equal to a correction voltage corresponding to the target pixel unit row.

7. The display panel driving method according to claim 6, wherein the determining a correction voltage corresponding to each target pixel unit row based on a preset correction voltage mapping table and a target grayscale value of each target gradient pixel unit in each target pixel unit row comprises:

for each target pixel unit row, based on the preset correction voltage mapping table and target grayscale values of target gradient pixel units in the target pixel unit row, determining correction voltages of the target gradient pixel units; and determining an average value of the correction voltages of the target gradient pixel units in the target pixel unit row as a correction voltage corresponding to the target pixel unit row.

8. The display panel driving method according to claim 5, wherein the outputting, through scanning lines corresponding to the non-target pixel unit row, scanning signals with turn-on voltages each equal to a first turn-on voltage comprises:

outputting, through the scanning lines corresponding to the non-target pixel unit row, scanning signals with turn-on voltages each equal to the first turn-on voltage; and outputting, through all the data lines, data signals with operating voltages being the first operating voltage.

9. A drive circuit, wherein the drive circuit is configured to drive a display panel for displaying, the display panel comprises a plurality of scanning lines extending along a row direction, a plurality of data lines extending along a column direction, and a plurality of pixel units arranged in an array and defined by intersections of the plurality of scanning lines and the plurality of data lines, wherein the drive circuit comprises a row driver, an algorithm controller, and a timing controller separately electrically connected to the row driver and the algorithm controller, wherein the timing controller is configured to control the row driver to output corresponding scanning signals to corresponding pixel unit rows through scanning lines;

the algorithm controller is configured to obtain a target grayscale value of each pixel unit in picture data of a frame to be displayed, determine, based on the target grayscale value of the pixel unit in the picture data of the frame to be displayed, a target pixel unit row that needs luminance compensation in the frame to be displayed, and feed the target pixel unit row back to the timing controller; and in a process of the display panel displaying a picture of the frame to be displayed, the timing controller is configured to control the row driver to output corresponding scanning signals through the plurality of scanning lines according to a preset time sequence to implement progressive scanning of a plurality of pixel unit rows, wherein when the drive circuit scans a non-target pixel unit row, the timing controller is specifically configured to control the row driver to output, through scanning lines corresponding to the non-target pixel unit row, scanning signals with turn-on voltages each equal to a first turn-on voltage; and when the drive circuit scans a target pixel unit row, the timing controller is specifically configured to control the row driver to output, through scanning lines corresponding to the target pixel unit row, scanning signals with turn-on voltages higher than the first turn-on voltage, wherein the non-target pixel unit row is a pixel unit row other than the target pixel unit row.

10. The drive circuit according to claim 9, wherein the algorithm controller configured to determine, based on the target grayscale value of the pixel unit in the picture data of the frame to be displayed, the target pixel unit row that needs luminance compensation in the frame to be displayed is configured to:

calculate, based on target grayscale values of a first pixel unit row in the picture data of the frame to be displayed, a proportion of low grayscale pixel units in the first pixel unit row, wherein the low grayscale pixel unit is a pixel unit with a target grayscale value less than a preset low grayscale threshold;

determine whether the proportion of the low grayscale pixel units in the first pixel unit row is greater than or equal to a first preset proportion threshold;

if the proportion of the low grayscale pixel units in the first pixel unit row is greater than or equal to the first preset proportion threshold, determine that the first pixel unit row is a target pixel unit row; and if the proportion of the low grayscale pixel units in the first pixel unit row is less than the first preset proportion threshold, determine that the first pixel unit row is not a target pixel unit row.

11. The drive circuit according to claim 10, wherein the algorithm controller is further configured to:

calculate, based on target grayscale values of the first pixel unit row to an $n^{th}$ pixel unit row in the picture data of the frame to be displayed, a proportion of low grayscale pixel units in the first pixel unit row to the $n^{th}$ pixel unit row, wherein n is an integer greater than 1; and determine whether the proportion of the low grayscale pixel units in the first pixel unit row to the $n^{th}$ pixel unit row is less than or equal to a second preset proportion threshold; and the algorithm controller configured to calculate, based on target grayscale values of the first pixel unit row in the picture data of the frame to be displayed, the proportion of low grayscale pixel units in the first pixel unit row is configured to:

if the proportion of the low grayscale pixel units in the first pixel unit row to the $n^{th}$ pixel unit row is less than or equal to the second preset proportion threshold, calculate, based on the target grayscale values of the first pixel unit row in the picture data of the frame to be displayed, the proportion of the low grayscale pixel units in the first pixel unit row.

12. The drive circuit according to claim 9, wherein the algorithm controller configured to determine, based on the target grayscale value of the pixel unit in the picture data of the frame to be displayed, the target pixel unit row that needs luminance compensation in the frame to be displayed is configured to:

for each pixel unit column in the picture data of the frame to be displayed, determine whether the pixel unit column comprises m gradient pixel units with target grayscale values progressively increasing or progressively decreasing;

if the pixel unit column comprises m gradient pixel units with target grayscale values progressively increasing or progressively decreasing, determine whether there is at least one pixel unit with a target grayscale value less than a preset low grayscale threshold in the m gradient pixel units, wherein m is a positive integer; and if there is at least one pixel unit with a target grayscale value less than the preset low grayscale threshold in the m gradient pixel units, determine, as a target gradient pixel unit, a pixel unit with a target grayscale value less than a preset high grayscale threshold in the m gradient pixel units, and determine, as the target pixel unit row, a pixel unit row where the target gradient pixel unit is located, wherein the preset high grayscale threshold is greater than the preset low grayscale threshold.

13. The drive circuit according to claim 12, wherein each data line is used to output a corresponding data signal to a corresponding pixel unit column, and the timing controller configured to control the row driver to output, through scanning lines corresponding to the target pixel unit row, scanning signals with turn-on voltages higher than the first turn-on voltage is configured to:

output, through the scanning lines corresponding to the target pixel unit row, scanning signals with turn-on voltages each equal to a second turn-on voltage, wherein the second turn-on voltage is higher than the first turn-on voltage; and output, through target data lines, data signals with operating voltages each equal to a first operating voltage, and output, through non-target data lines, data signals with operating voltages each equal to a second operating voltage, wherein the first operating voltage is lower than the second operating voltage, the target data line is a data line corresponding to a target gradient pixel unit in the target pixel unit row, and the non-target data line is a data line other than the target data line.

14. The drive circuit according to claim 12, wherein the algorithm controller is further configured to determine a correction voltage corresponding to each target pixel unit row based on a preset correction voltage mapping table and a target grayscale value of each target gradient pixel unit in each target pixel unit row, wherein a mapping relationship between a plurality of target grayscale values and a plurality of correction voltages is recorded in the preset correction voltage mapping table; and the timing controller configured to control the row driver to output, through scanning lines corresponding to the target pixel unit row, scanning signals with turn-on voltages higher than the first turn-on voltage is configured to:

output, through a scanning line corresponding to each target pixel unit row, a scanning signal with a turn-on voltage equal to a correction voltage corresponding to the target pixel unit row.

15. The drive circuit according to claim 14, wherein the algorithm controller configured to determine the correction voltage corresponding to each target pixel unit row based on the preset correction voltage mapping table and the target grayscale value of each target gradient pixel unit in each target pixel unit row is configured to:
for each target pixel unit row, based on the preset correction voltage mapping table and target grayscale values of target gradient pixel units in the target pixel unit row, determine correction voltages of the target gradient pixel units; and
determine an average value of the correction voltages of the target gradient pixel units in the target pixel unit row as a correction voltage corresponding to the target pixel unit row.

16. The drive circuit according to claim 13, wherein the timing controller configured to control the row driver to output, through scanning lines corresponding to the non-target pixel unit row, scanning signals with turn-on voltages each equal to the first turn-on voltage is configured to:
output, through the scanning lines corresponding to the non-target pixel unit row, scanning signals with turn-on voltages each equal to the first turn-on voltage; and
output, through all the data lines, data signals with operating voltages being the first operating voltage.

17. An LED display apparatus, comprising:
a drive circuit; and
a display panel, wherein the display panel is an LED display panel, the drive circuit is electrically connected to the display panel, and the drive circuit is configured to drive the display panel for displaying;
wherein the display panel comprises a plurality of scanning lines extending along a row direction, a plurality of data lines extending along a column direction, and a plurality of pixel units arranged in an array and defined by intersections of the plurality of scanning lines and the plurality of data lines, wherein
the drive circuit comprises a row driver, an algorithm controller, and a timing controller separately electrically connected to the row driver and the algorithm controller, wherein the timing controller is configured to control the row driver to output corresponding scanning signals to corresponding pixel unit rows through scanning lines;
the algorithm controller is configured to obtain a target grayscale value of each pixel unit in picture data of a frame to be displayed, determine, based on the target grayscale value of the pixel unit in the picture data of the frame to be displayed, a target pixel unit row that needs luminance compensation in the frame to be displayed, and feed the target pixel unit row back to the timing controller; and
in a process of the display panel displaying a picture of the frame to be displayed, the timing controller is configured to control the row driver to output corresponding scanning signals through the plurality of scanning lines according to a preset time sequence to implement progressive scanning of a plurality of pixel unit rows, wherein when the drive circuit scans a non-target pixel unit row, the timing controller is specifically configured to control the row driver to output, through scanning lines corresponding to the non-target pixel unit row, scanning signals with turn-on voltages each equal to a first turn-on voltage; and when the drive circuit scans a target pixel unit row, the timing controller is specifically configured to control the row driver to output, through scanning lines corresponding to the target pixel unit row, scanning signals with turn-on voltages higher than the first turn-on voltage, wherein the non-target pixel unit row is a pixel unit row other than the target pixel unit row.

* * * * *